(12) United States Patent (10) Patent No.: US 7,315,906 B2
Narukawa (45) Date of Patent: Jan. 1, 2008

(54) INTEGRATED CIRCUIT DEVICE HAVING NETWORK CONNECTION FOR IMAGE DATA PROCESSING OPERATION FOR OBTAINING AND LOADING A DRIVING PROGRAM FOR EXTERNAL DEVICE

(75) Inventor: Toshiki Narukawa, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 400 days.

(21) Appl. No.: 10/751,894

(22) Filed: Jan. 7, 2004

(65) Prior Publication Data

US 2004/0136031 A1 Jul. 15, 2004

(30) Foreign Application Priority Data

Jan. 7, 2003 (JP) ............................ 2003-001181

(51) Int. Cl.
G06F 3/12 (2006.01)
H01L 21/82 (2006.01)
H04N 1/00 (2006.01)

(52) U.S. Cl. ............................ 710/38; 710/1; 710/14; 710/31; 711/104; 711/115; 358/1.6; 358/1.13

(58) Field of Classification Search .................... 710/1, 710/14, 31, 38; 711/104, 115; 358/1.6, 1.13
See application file for complete search history.

(56) References Cited

U.S. PATENT DOCUMENTS 5,987,494 A * 11/1999 Ouchi ........................ 718/107

6,307,639 B1 * 10/2001 Eom et al. .................. 358/1.13
6,452,695 B1 * 9/2002 Casey et al. ................. 358/1.6
6,477,567 B1 11/2002 Ohara

FOREIGN PATENT DOCUMENTS

| JP | A 11-53139 | 2/1999 |
|---|---|---|
| JP | A 2000-187637 | 7/2000 |
| JP | A 2000-216935 | 8/2000 |
| JP | A-2002-203908 | 7/2002 |
| JP | A-2002-281198 | 9/2002 |

* cited by examiner

*Primary Examiner*—Tammara Peyton
(74) *Attorney, Agent, or Firm*—Oliff & Berridge, PLC

(57) ABSTRACT

To design an integrated circuit device, i.e., a main ASIC, that can easily be used for both communications and image data processing. To use the ASIC for the purpose of image data processing, the ASIC is set to a first operation mode, wherein a printer engine and a laser scanner are controlled via a printer engine controller and laser scanner controller. To use the ASIC for the purpose of communications, it is set to a second operation mode, wherein communications data is received from a remote device connected to a network chip via a network. In this manner, the ASICs with the same hardware configuration can be used in different purposes while switching operation modes.

18 Claims, 5 Drawing Sheets

INTEGRATED CIRCUIT DEVICE HAVING NETWORK CONNECTION FOR IMAGE DATA PROCESSING OPERATION FOR OBTAINING AND LOADING A DRIVING PROGRAM FOR EXTERNAL DEVICE

BACKGROUND OF THE INVENTION

1. Field of the Invention

The present invention relates to integrated circuit devices capable of controlling an image data processing device and a network connection device.

2. Description of the Related Art

Printers and other image forming devices can be connected to the Internet, LAN and other networks and be used to form images from data received via such networks. Japanese Patent Application Publication No. 11-53139 proposes equipping two separate sets of integrated circuit devices to such an image forming device, one for mainly performing communications and another for mainly performing image formations. Such a configuration would enable parallel processing and improve processing speed.

A recent trend in semiconductor technology is to use an ASIC (Application Specific Integrated Circuit) in which integrated are a CPU and a hardware (ports, buses and controllers that control the ports and the buses) connected to the CPU. ASIC simplifies control board manufacture and improves manufacturing efficiency of image forming devices.

However, when the integrated circuit devices used specifically for communications and those used specifically for image formation coexist, as described above, the communications ASIC and the image forming ASIC need to be separately designed. The same problem also applies to scanners that scan images concurrently with performing communication tasks.

SUMMARY OF THE INVENTION

In view of the foregoing, it is an object of the invention to provide an integrated circuit device that can be commonly used for both communications and image formation.

To achieve the above and other object, there is provided an integrated circuit device that includes a first terminal portion, a second terminal portion, a third terminal portion, an operation mode setting device, and a processing device. The integrated circuit device has such a structure that one of a first external device and a second external device is selectively connectable to the first terminal portion, one of a third external device and a fourth external device is selectively connectable to a second terminal portion, and an image forming device is connectable to the third terminal portion. The operation mode setting device sets the integrated circuit device to either a first operation mode or a second operation mode. The processing device controls the first terminal portion, the second terminal portion and the third terminal portion, and further controls data transmission/reception via each of the first terminal portion, the second terminal portion and the third terminal portion. When at least one of the first external device and the third external device is connected to relevant terminal portion, the first operation mode is set by the operation mode setting device. In this case, the processing device controls the image forming device connected to the third terminal portion to form images based on data supplied from one of the first external device and the third external device. On the other hand, when the second external device is connected to the first terminal portion, the second operation mode is set by the operation mode setting device. In this case, the processing device controls the first terminal portion to perform transmission/reception of first data to and from the second external device. When the second external device is connected to the first terminal portion and the fourth external device is connected to the second terminal portion, the second operation mode is set by the operation mode setting device. In this case, the processing device controls the first terminal portion to perform transmission/reception of the first data to and from the second external device and also controls the second terminal portion to perform transmission/reception of second data to and from the fourth external device. The second data corresponds to the first data.

According to another aspect of the invention, there is provided a communication interface device that includes a first terminal portion, a second terminal portion, and a processing device. A network chip is connected to the first terminal portion and an image data processing device is connected to the second terminal portion. The processing device controls the first terminal portion and the second terminal portion, and further controls data transmission/reception via each of the first terminal portion and the second terminal portion. The processing device controls the first terminal portion to upload/download first data to and from a remote device connected to the network chip via a network, and also controls the second terminal portion to perform transmission/reception of second data to and from the image data processing device. The second data corresponds to the first data.

According to still another aspect of the invention, there is provided an image data processing device that includes a first integrated circuit device. The image data processing device may further include a second integrated circuit. The first integrated circuit device includes a first terminal portion to which a first external device is connected, a second terminal portion to which a second external device is connected, a third terminal portion to which an image forming device is connected, and a first processing device. The first processing device controls the first terminal portion and the second terminal portion and further controls data transmission/reception via each of the first terminal portion, the second terminal portion and the third terminal portion. The first processing device controls the image forming device to form images based on data supplied from the at least one of the first external device and the second external device.

The second integrated circuit device is identical in a hardware structure to the first integrated circuit device but can be used in different purposes. The second integrated circuit device includes a fourth terminal portion corresponding to the first terminal portion, to which a network chip is connected, a fifth terminal portion corresponding to the second terminal portion, to which the first integrated circuit device is connected, and a second processing device. The second processing device controls the fourth terminal portion and the fifth terminal portion, and further controls data transmission/reception via each of the fourth terminal portion and the fifth terminal portion. The second processing device controls the fourth terminal portion to upload/download first data to, and from a remote device connected to the network chip via a network, and also controls the fifth terminal portion to perform transmission/reception of second data to and from th first integrated circuit device. The second data corresponds to the first data.

DETAILED DESCRIPTION OF THE PREFERRED EMBODIMENTS

Figure 1:
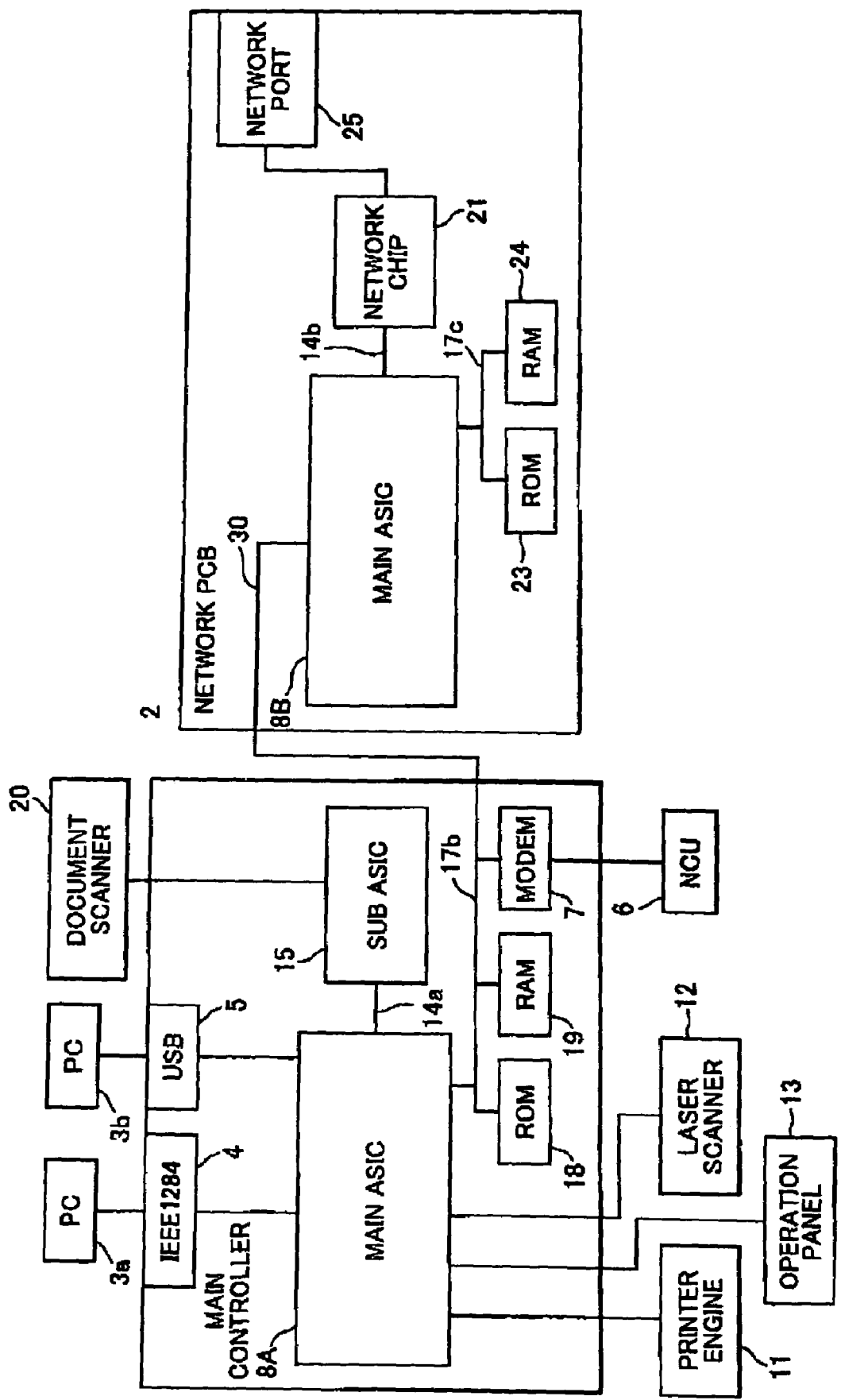
FIG. 1 is a block diagram showing a configuration of a printer in accordance with an embodiment of the present invention.

Preferred embodiments of the invention will be described while referring to the accompanying drawings. FIG. 1 is a block diagram showing a configuration of a so-called network printer to which the present invention is applied. In use, the network printer is connected to the Internet, LAN or other network and capable of receiving data via the networks and printing images based on the data received.

As shown in FIG. 1, the printer in this embodiment includes an image data processing board serving as a main controller 1, and a communications interface board serving as a network printed circuit board 2 (hereinafter referred to as "network PCB 2"). Note that the network PCB 2 is provided as an option so it can be removed if unnecessary.

The main controller 1 includes an IEEE1284 port 4 that can be connected to a personal computer (PC) 3a using a parallel cable, a USB port 5 that can be connected to a PC 3b using a USB cable, and a modem 7 that is connected to the telephone lines via an NCU (network control unit) 6 to enable facsimile communication.

The main controller 1 further includes an integrated circuit device in the form of a main application-specific integrated circuit (ASIC) BA containing a CPU 80 (to be described later). The main ASIC 8A governs the operations of the main controller 1 together with a sub ASIC 15 to be described later. Connected to the main ASIC 8A are the IEEE1284 port 4, the USB port 5, a printer engine 11 for forming images on a print paper (not shown), a laser scanner 12 for forming an electrostatic latent image on a photosensitive drum (not shown) provided in the printer engine 11, and an operation panel 13.

The sub ASIC 15 is connected to the main ASIC 8A via a PCI bus 14a. Also, a ROM 18, a RAM 19 and the modem 7 are connected via an external system bus 17b to the main ASIC 8A. The sub ASIC 15 controls a document scanner 20 that scans document images and transfers the corresponding image data to the sub ASIC 15. The ROM 18 stores an image forming program that drives and controls the printer engine 11 and other devices.

The network PCB 2 also includes a main ASIC 8B that is identical to the main ASIC 8A provided in the main controller 1. A PCI bus 14b connects the main ASIC 8B to a network chip 21 that serves as a communication device, while an external system bus 17c connects the main ASIC 8B to a ROM 23 and a RAM 24. The network PCB 2 is equipped with a network port 25 to connect the network PCB 2 to the above-mentioned network. The main ASIC 8B communicates with the network via the network chip 21 and the network port 25. Furthermore, the main ASIC 8B in the network PCB 2 is directly connected to the external system bus 17b of the main controller 1 via a control parallel bus 30. The ROM 23 stores a communications program used by the network.

Figure 2:
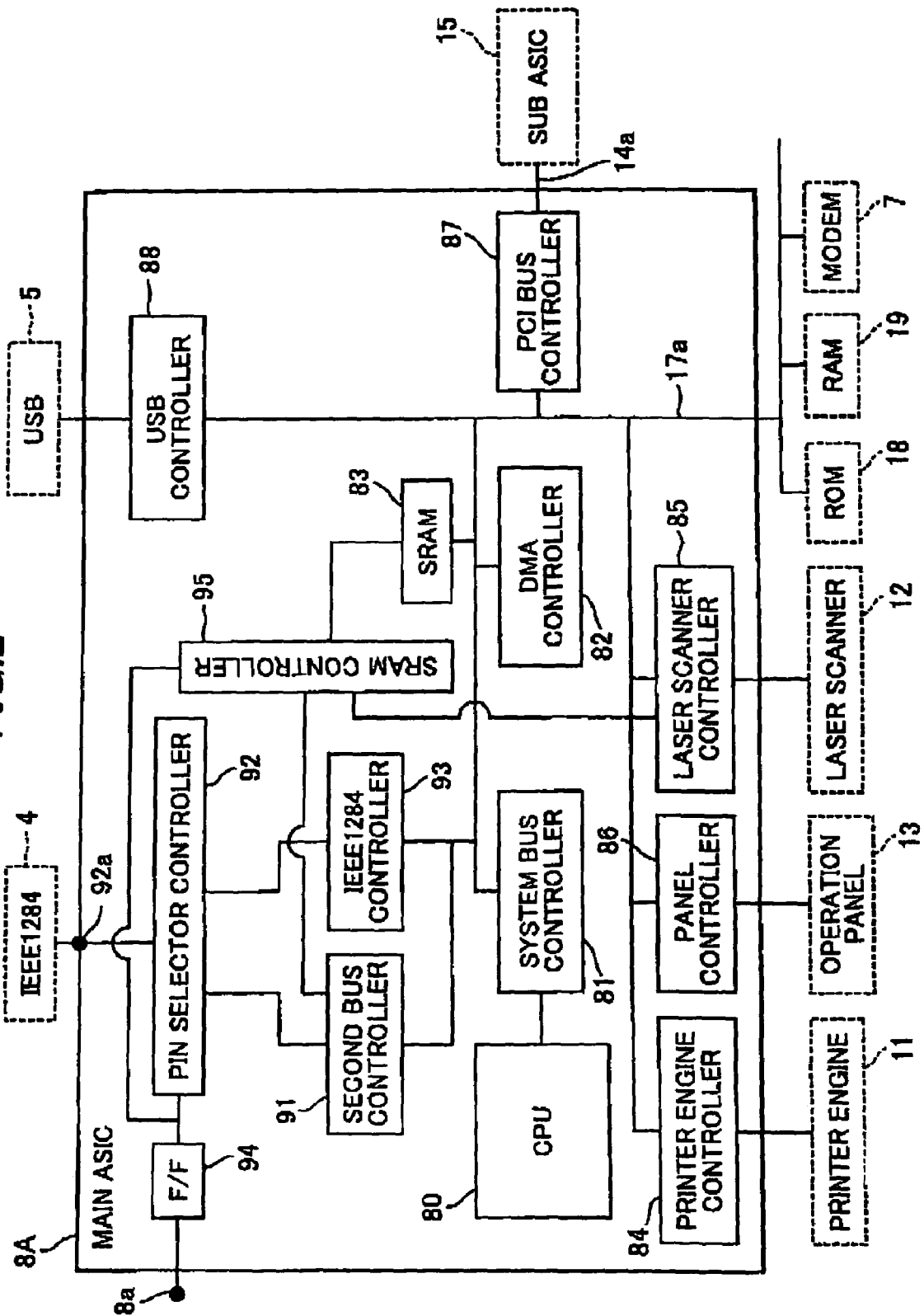
FIG. 2 is a block diagram showing a configuration of a main ASIC incorporated in the printer shown in FIG. 1.

Next, the configuration of the main ASIC 8A will be described in detail while referring to FIG. 2. Note that the configuration of the main ASIC 8B provided in the network PCB 2 is identical to that of the main ASIC 8A. As shown in FIG. 2, the CPU 80 is connected to an internal system bus 17a via a system bus controller 81. The internal system bus 17a and the external system bus 17b will be referred collectively to as "system bus 17" provided that there are no distinctions therebetween in terms of signals passing therethrough and functions of the two buses. Connected to the internal system bus 17a are a DMA controller 82, an SRAM 83, the printer engine controller 84, a laser scanner controller 85, a panel controller 86, a PCI bus controller 87, and a USB controller 88. The printer engine controller 84 has a port to which the printer engine 11 is connectable. Likewise, the laser scanner controller 85 has a port to which the laser scanner 12 is connectable. The panel controller 86 has a port to which an operation panel 13 is connectable. The PCI bus controller 87 has a port to which the PCI bus 14a is connectable.

The internal system bus 17a is connected to a pin selector controller 92 via a second bus controller 91 and an IEEE1284 controller 92. A mode select signal input to a mode select terminal 8a provided on the housing of the main ASIC 8 switches a flip-flop (F/F) 94. The output of the flip-flop 94 determines whether the pin selector controller 92 connects the second bus controller 91 or the IEEE1284 controller 93 to a pin 92a (only one pin is shown in the figure, but actually there are multiple pins that are provided on a bit basis for multi-bit data output from the pin selector controller 92). The SRAM 83 is connected to an SRAM controller 95 that switches connections depending on the output of the flip-flop 94. The output of the flip-flop 94 determines whether the SRAM controller 95 connects the SRAM 83 to the second bus controller 91 or to the laser scanner controller 85.

When the mode select signal input to the mode select terminal 8a indicates a first operation mode, the main ASIC 8A operates to receive image data from the PC 3a and print images based on the image data received. Specifically, in the first operation mode, the pin selector controller 92 is switched to the IEEE1284 controller 93 and the SRAM controller 95 is switched to the laser scanner controller 85. Then the pin 92a is connected to the IEEE1284 port 4 enabling reception of the image data from the PC 3a. The image data received therefrom is temporarily stored in the SRAM 83 serving as a buffer and printed by the printer engine 11 and the laser scanner 12.

When the mode select signal input to the mode select terminal 8a indicates a second operation mode, the main ASIC 8A cooperates with the network PCB 2. Specifically, in the second operation mode, the pin selector controller 92 is switched to the second bus controller 91 and the SRAM controller 95 is also switched to the second bus controller 91. Then the pin 92a is connected to the second bus 30. In this state, data can be sent to the main controller 1 from the network PCB 2 via the second bus 30. The SRAM 83 is then used as a FIFO (First-In First-Out) memory to store the data transferred from the network PCB 2.

The CPU 80 provided in the main ASIC 8B of the network PCB 2 converts data received via the network chip 21 to intermediate code for image data, and directly transfers the resulting data to the system bus 17 of the main controller 1 via the second bus 30. The CPU 80 provided in the main ASIC 8A of the main controller 1 converts the intermediate code to dot data to control the printer engine 11 and the laser scanner 12.

The CPU 80 in the main controller 1 performs the following tasks: Copying of the original image read by the document scanner 20 with the printer engine 11 and laser scanner 12; FAX reception of facsimile data received via the modem 7; FAX transmission of original image read by the document scanner 20 that is sent as facsimile data via modem 7; Printing of images based on image data received from the PC 3a via the IEEE1284 port 4 or received from the PC 3b via the USB port 5.

As described above, the CPUs 80 in the main ASICs 8A and 8B execute different functions due to different programs stored in the ROMs 23 and 18. The program may contain hardware requirements dictating which port, bus or controller CPU 80 should be connected to and these requirements must be met to ensure smooth program operation. Since the ports in this embodiment are switched according to operation mode as described above, the main ASIC 8A is capable of performing the two types of operation described above.

The use of the same main ASIC 8 for image data processing and communications simplifies both the design and assessment of the control system and reduces printer manufacturing costs. In this embodiment, the second bus 30 is directly connected to the system bus 17 of the main controller 1. This makes the main ASIC 8A free from transmission/reception of the image data to and from the second bus 30, allowing the main ASIC 8A to concentrate on image forming operation. Not only does this allow parallel processing of communications and image forming operation, but speeds up image forming operation.

According to the embodiment described, the connection of the SRAM 83 is switched depending on the operation mode, thereby enabling highly efficient use of the SRAM 83 both in communications and image forming operations.

Figure 3:
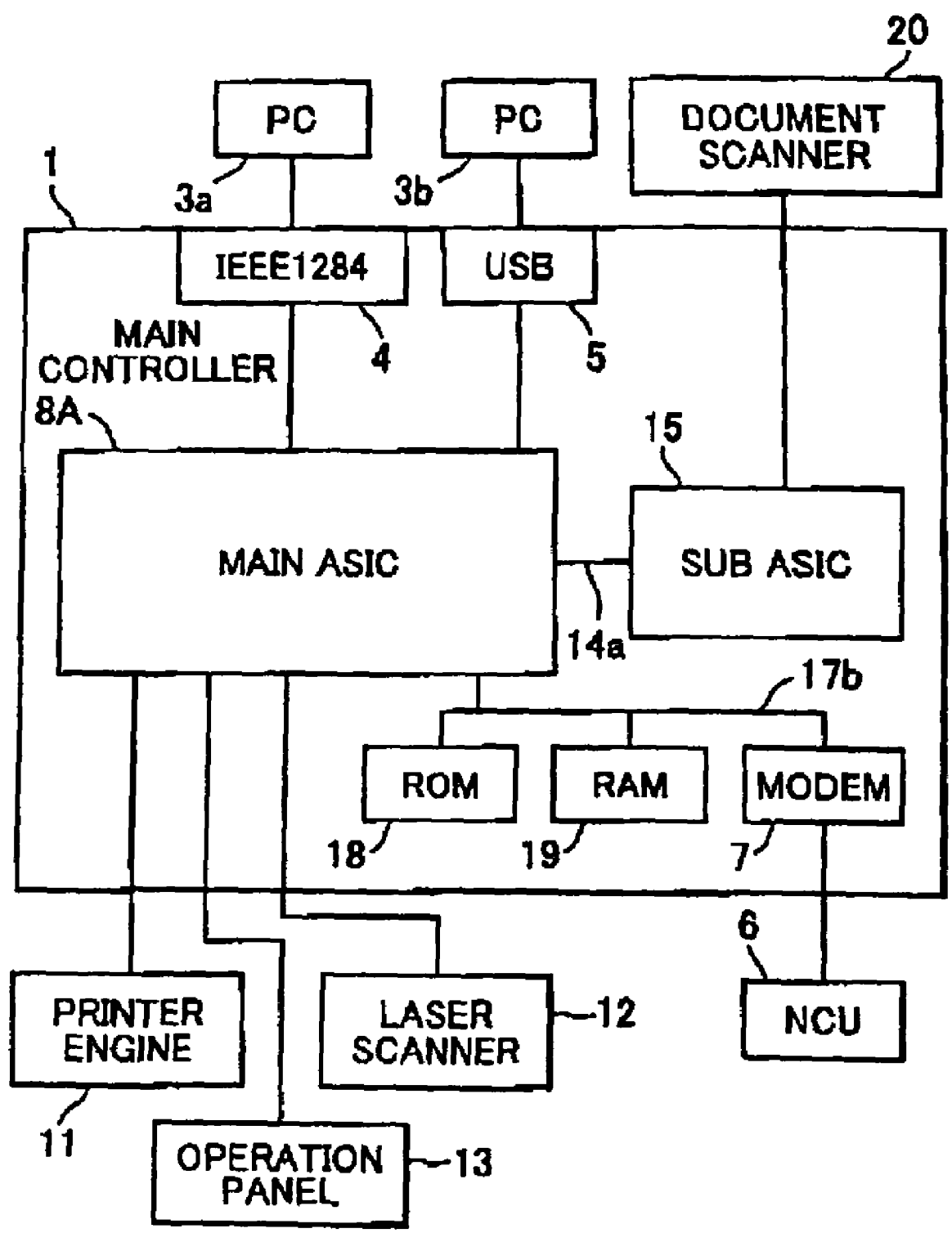
FIG. 3 is a block diagram showing a configuration of a printer in accordance with a first modification of the embodiment shown in FIG. 1.
Figure 4:
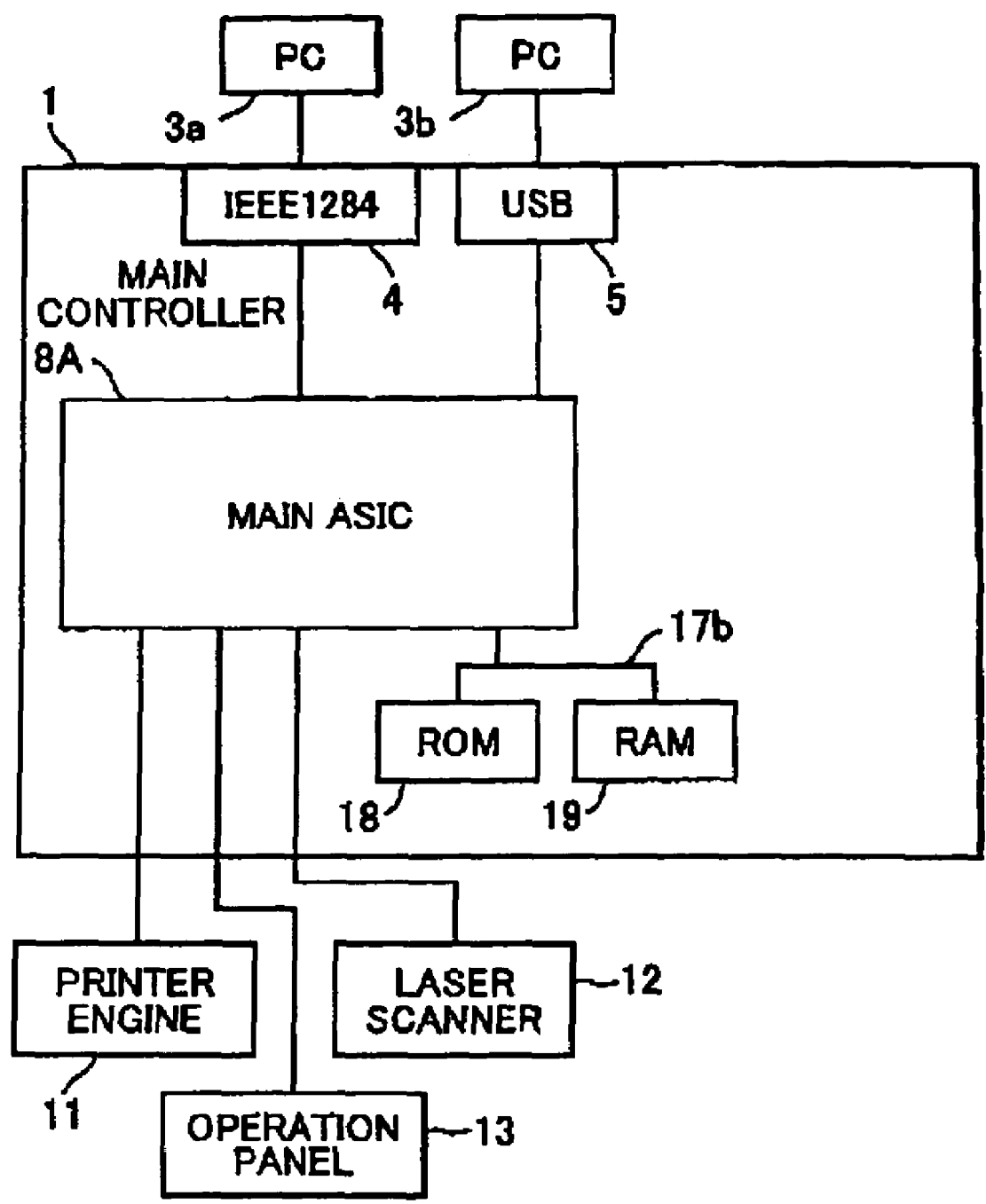
FIG. 4 is a block diagram showing a configuration of a printer in accordance with a second modification of the embodiment shown in FIG. 1.

While the preferred embodiment of the invention has been illustrated and described, it will be appreciated for a person skilled in the art that various changes and modifications can be made without departing from the spirit of the invention. For example, as shown in FIG. 3, the network PCB 2 and its associated second bus 30 may be removed to use the main controller 1 and its associated components as a facsimile device and a PC printer. Also in this case, copying function, FAX reception function, FAX transmission function and PC printing function can be achieved as described above. As shown in FIG. 4, the modem 7, the document scanner 20 and the sub ASIC 15 may be removed to use the device as a PC printer.

Figure 5:
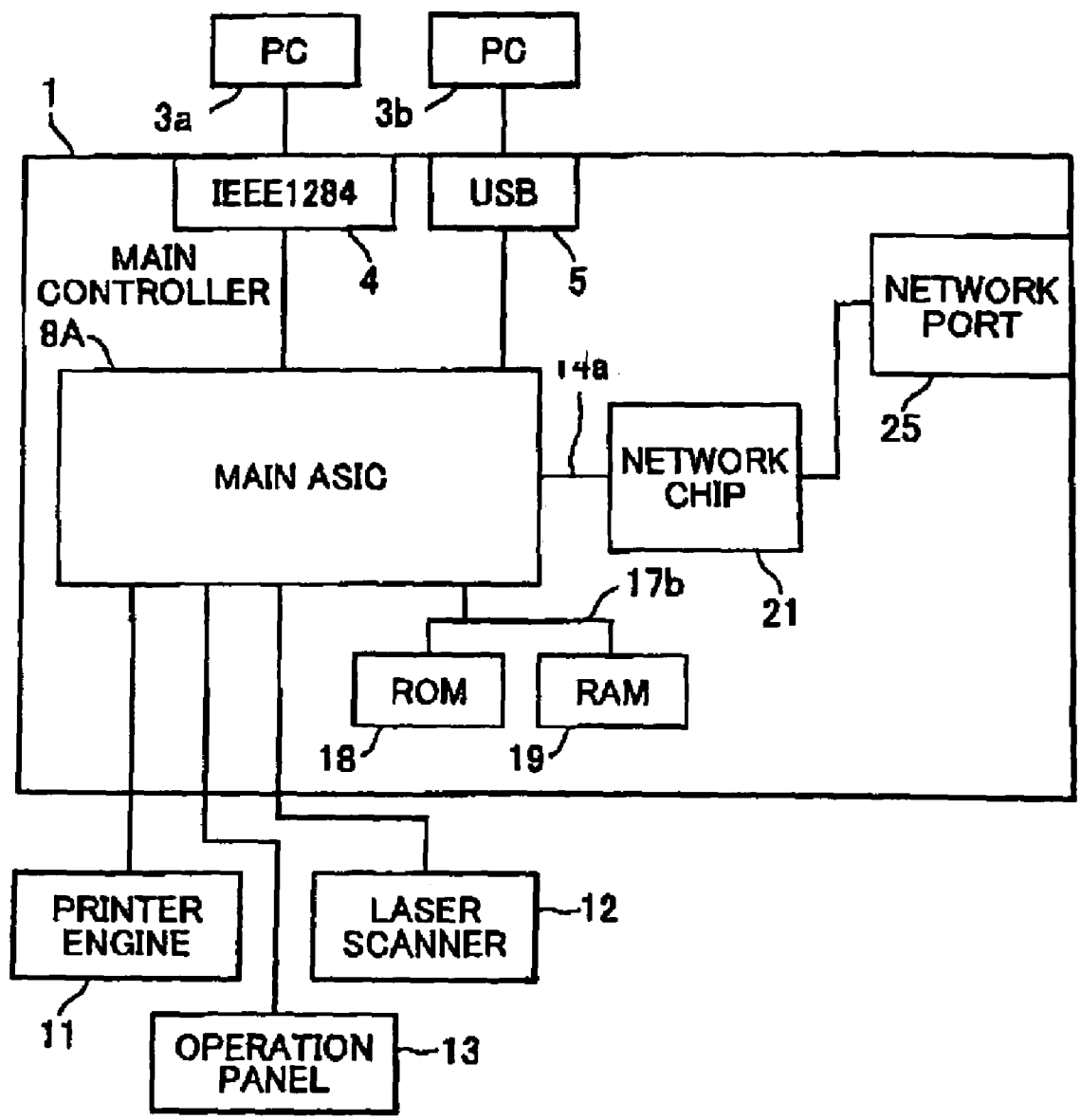
FIG. 5 is a block diagram showing a configuration of a printer in accordance with a third modification of the embodiment shown in FIG. 1.

As shown in FIG. 5, the configuration shown in FIG. 4 may further be modified to connect a network chip 21 to the PCI bus controller 87 (see FIG. 2) of the main ASIC 8A via the PCI bus 14 and to connect a network port 25 to the network chip 21. Then the device shown in FIG. 5 can be used as a network printer capable of forming images based on data received via the network. In this case, the ROM 18 must store a network communications program. Although the single CPU 80 will be used in time sharing manner to perform both communications and image forming processes, the use of a versatile main ASIC 8A for both communications and image processing lowers costs. The main ASIC 8A in this case is placed in the first operation mode. The main ASIC 8A does not transmit data via the second bus 30 and therefore need not be placed in the second operation mode.

Thus the use of one ASIC 8A can implement four types of image forming devices as shown in FIGS. 1, 3, 4 and 5, simplify design of the control system, and reduce the cost of the image forming device.

In the main ASIC 8A in the above-described embodiment, the pin selector controller 92 selectively connects the pin 92a to the second bus controller 91 or the IEEE1284 controller 93. However, a set of pins for connection to the second bus controller 91 and another set of pins for connection to the IEEE1284 controller 93 could both be located on the periphery of the main ASIC 8A. With such a configuration, the mode switching described above could be performed depending on which set of pins is connected to the external circuit. This would make it possible to further simplify internal ASIC 8A design and lower manufacturing costs. On the other hand, provision of only one set of pins as in the described embodiment reduces the number of pins around the main ASIC 8A and makes it more compact.

Furthermore, the first and second buses can be used for miscellaneous other functions. However, since the above described embodiment uses the PCI bus 14 as the first bus, data transmission via the PCI bus 14 is extremely quick, so that the above-described processes can be implemented at a high speed. The invention can be applied to image data processing devices that are equipped with only the document scanner 20.

This invention can be applied to devices that use a communications board as the main controller and use an image data processing board as an option. The CPU 80 does not need to be a part of the integrated circuit but can be supplied from outside via the external system bus.

What is claimed is:

1. An integrated circuit device comprising:
    a first terminal portion to which one of a first external device and a second external device is selectively connectable;
    a second terminal portion to which a third external device is selectively;
    a third terminal portion to which an image forming device is connectable;
    an operation mode setting device that sets either a first operation mode or a second operation mode; and
    a processing device that controls the first terminal portion, the second terminal portion and the third terminal portion, and further controls data transmission/reception via each of the first terminal portion, the second terminal portion and the third terminal portion,
    wherein when the second external device is connected to the first terminal portion, the first operation mode is set by the operation mode setting device wherein the processing device controls the image forming device connected to the third terminal portion to form images based on data supplied from the second external device, and when the third external device is connected to the second terminal portion, the second operation mode is set by the operation mode setting device wherein the processing device controls the first terminal portion to perform transmission/reception of first data to and from the third external device.

2. The integrated circuit device according to claim 1, wherein when the third external device is connected to the second terminal portion and the first external device is connected to the first terminal portion, the second operation mode is set by the operation mode setting device wherein the processing device controls the second terminal portion to perform transmission/reception of the first data to and from the third external device and also controls the first terminal portion to perform transmission/reception of second data to and from the first external device, the second data corresponding to the first data.

3. The integrated circuit device according to claim 2, wherein the processing device comprises a first processing device and a second processing device, the first processing device controlling the first terminal portion, the second terminal portion and the third terminal portion, and further controlling data transmission/reception via each of the first terminal portion, the second terminal portion and the third terminal portion when the first operation mode is set by the operation mode setting device, the second processing device controlling the first terminal portion, the second terminal portion and the third terminal portion, and further controlling data transmission/reception via each of the first terminal portion, the second terminal portion and the third terminal portion when the second operation mode is set by the operation mode setting device.

4. The integrated circuit device according to claim 3, further comprising a switching device that switches the first processing device to the second processing device and vice versa in accordance with operation mode set by the operation mode setting device.

5. The integrated circuit device according to claim 1, wherein the first terminal portion comprises a first set of terminals connectable to the second external device and a second set of terminals connectable to the first external device.

6. The integrated circuit device according to claim 5, wherein when the second external device is connected to the first set of terminals, the first operation mode is set by the operation mode setting device and when the first external device is connected to the second set of terminals, the second operation mode is set by the operation mode setting device.

7. The integrated circuit device according to claim 1, wherein the second terminal portion is connectable to one of the third external device and a fourth external device.

8. The integrated circuit device according to claim 7, wherein the fourth external device is a document scanning device that scans document images and creates document image data indicative of the document images, the processing device receiving the document image data from the document scanning device and controlling the image forming device to form the images based on the document image data.

9. The integrated circuit device according to claim 8, further comprising a storage device connected to the first terminal portion wherein the processing device temporarily storing the document image data into the storage device.

10. The integrated circuit device according to claim 8, wherein the second external device is a personal computer that stores image data, the processing device receiving the image data from the personal computer and controlling the image forming device to form the images based on the image data.

11. The integrated circuit device according to claim 10, further comprising a storage device connected to the first terminal portion wherein the processing device temporarily storing the image data into the storage device.

12. The integrated circuit device according to claim 1, wherein the third external device is a network device connectable to a remote device through a network, the processing device uploading/downloading communications data to and from the remote device.

13. The integrated circuit device according to claim 12, further comprising a FIFO memory connected to the second terminal portion wherein the processing device stores the communications data into the FIFO memory.

14. The integrated circuit device according to claim 13, wherein the first external device is an image data processing device, the processing device downloading the communications data from the remote device, converting the communications data to intermediate data, and transferring the intermediate data to the image data processing device.

15. The integrated circuit device according to claim 14, further comprising a FIFO memory connected to the second terminal portion wherein the processing device stores the communications data into the FIFO memory before transferring the intermediate data to the image data processing device.

16. The integrated circuit device according to claim 1, further comprising a fourth terminal portion to which a fifth external device is connectable, the fifth external device storing second image data, wherein when the fifth external device is connected to the fourth terminal portion, the first operation mode is set by the operation mode setting device wherein the processing device controls the image forming device connected to the third terminal portion to form images based on the second image data supplied from the fifth external device.

17. The integrated circuit device according to claim 16, wherein the fifth external device is a personal computer, the processing device receiving the second image data from the personal computer and controlling the image forming device to form the images based on the second image data.

18. An image data processing device comprising:
a first integrated circuit device that comprises:
a first terminal portion to which a first external device is connected;
a second terminal portion to which a second external device is connected;
a third terminal portion to which an image forming device is connected; and
a first processing device that controls the first terminal portion and the second terminal portion and further controls data transmission/reception via each of the first terminal portion, the second terminal portion and the third terminal portion, wherein the first processing device controls the image forming device to form images based on data supplied from the at least one of the first external device and the second external device; and
a second integrated circuit device identical in a hardware structure to the first integrated circuit device, the second integrated circuit device comprising:
a fourth terminal portion corresponding to the first terminal portion, to which a network chip is connected;
a fifth terminal portion corresponding to the second terminal portion, to which the first integrated circuit device is connected;
a second processing device that controls the fourth terminal portion and the fifth terminal portion, and further controls data transmission/reception via each of the fourth terminal portion and the fifth terminal portion,
wherein the second processing device controls the fourth terminal portion to upload/download first data to and from a remote device connected to the network chip via a network, and also controls the fifth terminal portion to perform transmission/reception of second data to and from the first integrated circuit device, the second data corresponding to the first data.

* * * * *